Figure 1:
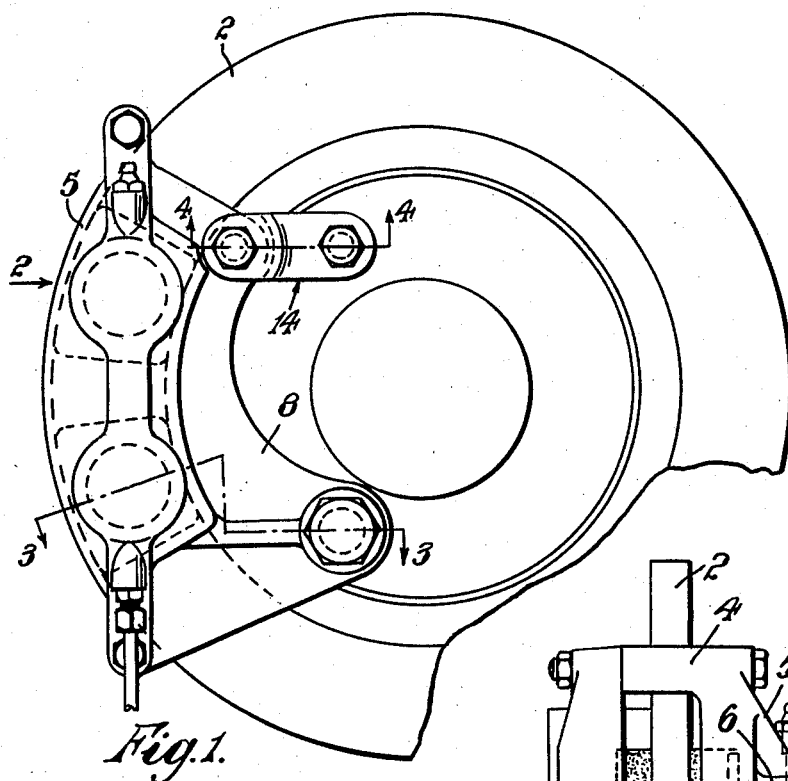

Feb. 10, 1959  H. J. BUTLER  2,873,005
DISC BRAKE FOR VEHICLES
Original Filed Nov. 12, 1952

INVENTOR
Henry James Butler
by Benj. T. Rauber
his attorney

United States Patent Office 2,873,005
Patented Feb. 10, 1959

2,873,005

DISC BRAKE FOR VEHICLES

Henry James Butler, Sutton Coldfield, England, assignor to Dunlop Rubber Company Limited, London, England, a British company Original application November 12, 1952, Serial No. 319,972, now Patent No. 2,784,811, dated March 12, 1957. Divided and this application January 3, 1957, Serial No. 632,280

3 Claims. (Cl. 188—73)

This invention relates to disc brakes for vehicles, more particularly to disc brakes for motor vehicles and the like, and is a division of my previous United States application Serial No. 319,972 filed on November 12, 1952, now Patent No. 2,784,811, granted March 12, 1957.

Disc brakes for motor vehicles and the like generally comprise a disc, secured to a wheel or transmission shaft, and rotatable in a vertical plane. A non-rotatable housing straddles the disc at one location and is provided with torque-absorbing pads of friction material and one or more fluid-pressure operated mechanisms for forcing the friction pads and disc together in friction engagement to decelerate the vehicle or the like. In many such installations the disc is secured to a wheel which is, in turn, mounted on an axle shaft, and the housing is secured non-rotatably to a rigid part of the vehicle chassis. It has been found that the axle shaft deflects or bows when subjected to a sudden loading, e. g. on cornering the vehicle or running on a steeply cambered road, with the result that the disc no longer rotates in a truly vertical plane with respect to the rigid housing. The bowing of the shaft, due to forward component of the moving vehicle, is seldom in a plane at right angles to the ground surface, but may be inclined to one side or other of said plane. The result is that the disc wobbles or oscillates to each side of its normal vertical plane. The friction pads, however, are constrained to move axially in the rigid housing, with the result that on applying the brake, with the above condition prevailing, the efficiency of the brake is substantially reduced.

The object of the present invention is to provide an improved type of disc brake for road vehicles and the like.

According to the invention, therefore, a disc brake assembly for vehicles and the like comprises a disc normally rotatable in a vertical plane, a non-rotatable housing having members on opposite sides of the disc connected together adjacent a periphery of the disc, friction pads associated with said members to frictionally engage the braking surfaces of said disc, a mechanism to effect said frictional engagement and an articulated linkage to connect the housing to a non-rotatable member to permit substantially-axial movement of said housing relative to the disc to enable said frictional engagement to be made and also to permit tilting of the housing to accommodate wobbling or oscillation of said disc from said vertical plane.

According to the invention also a disc brake for vehicles and the like comprises a disc normally rotatable in a vertical plane, a non-rotatable housing comprising a pressure member and a reaction member axially-aligned on opposite sides of the disc and covering only a minor portion of the braking surfaces thereof and connected together by means extending axially adjacent a periphery of said disc, a first pad of friction material secured to the pressure member to frictionally engage one face of the disc, a second pad of friction material to frictionally engage the other face of the disc, a fluid pressure operated mechanism associated with the reaction member to force said second pad in one direction into contact with one face of the disc and to move the housing in the opposite direction to force said first pad into contact with the other face of the disc and an articulated connection between the housing and a fixed member to enable the housing to move axially or substantially axially relative to the disc and at the same time to tilt to accommodate wobbling or oscillation of said disc from said vertical plane.

The two members may be connected together by a portion extending axially adjacent a periphery of the disc, as in a caliper. However to ensure economy of weight and materials, and adequate heat dissipation, the two members are preferably interconnected at each end only by means extending adjacent a periphery of the disc.

One of the members on either side of the disc is connected to a non-rotatable part of the wheel assembly through an articulated linkage which, upon actuation of the fluid-pressure mechanism, allows the members to move sufficiently, substantially-axially and also tiltingly, for full engagement of the friction pads to take place regardless of oscillation and the like of the disc.

The fluid-pressure operated mechanism may be a piston and cylinder mechanism, the cylinder thereof being formed integrally with the reaction member or secured thereto and the piston fluid-tightly slidable in the cylinder. The side of the piston remote from the cylinder has associated therewith a pad of friction material adapted to frictionally engage one face of the disc. The pressure member on the other side of the disc, which is connected to the reaction member, is also provided with a friction pad to frictionally engage the other side of the disc. An increase in pressure between the piston and the base of the cylinder forces said piston and base mutually apart. The piston is moved towards the disc, thus forcing the friction pad associated therewith into frictional contact with the disc. The reaction member simultaneously moves away from the disc, thus forcing the pressure member towards the disc and the friction pad associated therewith into frictional contact with the disc. This construction may alternatively comprise two or more piston and cylinder mechanism.

Disc brakes constructed according to the present invention may also be applied mechanically e. g. as by a hand lever and cable.

Figure 3:
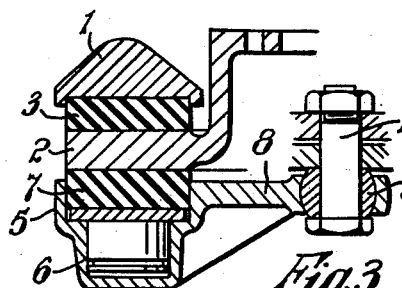
Figure 4:
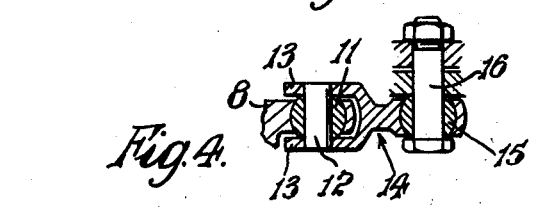
Figure 2:
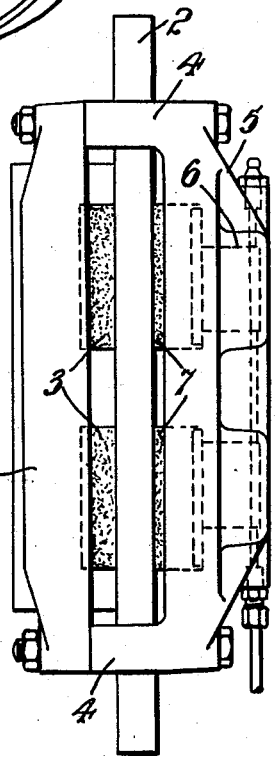

In order that the invention shall be more fully described, reference is made to the accompanying drawings of which:

Figure 1 is a view of a brake disc and disc brake assembly constructed in accordance with the invention, Figure 2 is a view of the assembly taken in the direction of arrow 2 of Figure 1, Figure 3 is a part section of the assembly taken through the line 3—3 of Figure 1 and looking in the direction of the arrows, and Figure 4 is a scrap section of the assembly taken through the line 4—4 of Figure 1 and looking in the direction of the arrows.

In the embodiment of the invention illustrated in the accompanying drawings the brake comprises a pressure members 1 on one side of the disc 2 having pads of friction material 3 secured thereto to frictionally engage one face of the disc. Rigidly secured to said pressure member by members 4 which extend axially adjacent a periphery of said disc is a reaction member 5 located on the other side of said disc and axially-aligned with the member 1. Said reaction member is provided with a twin piston and cylinder mechanism 6 and pads of friction material 7 are associated with said pistons and are adapted to frictionally contact the adjacent face of the disc.

The reaction member 5 is provided, on its inner side, with a ribbed flange 8 extending substantially inwardly towards the hub of the wheel. At one end of this flange is provided a hole having a part-spherical periphery and a bush 9 having a complementary outer periphery is fitted in said hole. An axially extending pin 10 is fitted within said bush, being secured at one end to a non-rotatable part of the wheel assembly. The other end of the flange is likewise provided with a hole having a part-spherical sided bush 11 therein, and a pin 12 extending axially within said bush has its two ends each secured to one of two arms 13 of a bifurcated portion of a link 14. The other end of the link is provided with a hole having a third part-spherical bush 15 fitted therein and through said bush is fitted an axially-extending pin 16 having one end secured to said non-rotatable part of the wheel assembly.

In the operation of the brake, as fluid-pressure is applied behind the piston 6, as by operation of the brake pedal in the known manner, the friction pad 7 is forced against the adjacent side of the disc 2. As soon as this friction pad 7 touches the disc the fluid-pressure in the space behind the piston 6 causes the reaction member 5 to be moved in the opposite direction and as the pressure member 1 is rigidly connected to the reaction member 5, movement of the reaction member away from the disc causes the pressure member 1 to be drawn towards it, and the friction pad 3 is accordingly pressed into frictional engagement with the opposite side of the disc 2. Axial or substantially axial movement of the conjoined members 1 and 5 is made possible by the ability of the flange 8 to pivot about the part-spherical bushes 9 and 15.

The bush 11 permits a limited angular or tilting movement of the flange 8 and the associated friction pads 3, 7 and members 1, 5 to allow the pads squarely to press against the sides of the disc 2, despite oscillation or deviation of the disc from its true vertical plane of rotation due e. g. to bowing of the axle as a result of cornering or excessive road camber.

What I claim is:

1. A disc brake assembly for vehicles or the like comprising a disc normally rotatable in a vertical plane, a non-rotatable housing having members on opposite sides of the disc connected together adjacent a periphery of the disc, friction pads associated with said members to frictionally engage the braking surfaces of said disc, a mechanism to effect said frictional engagement, wherein said housing comprises a pressure member and a reaction member each extending chordally across and on opposite sides of said disc and being joined together at their opposite ends adjacent the periphery of said disc, said pressure member having one or more friction pads rigidly associated therewith, and said reaction member having said mechanism axially-slidably associated therewith, and having at least one friction pad rigidly associated with said mechanism, and wherein said reaction member comprises a radially-inwardly extending flange having at one end thereof a part-spherical hole, a part-spherical bush located in said hole and a pin secured to a non-rotatable portion of said vehicle and extending axially through said bush, a link associated with the other end of said flange and extending radially-inwardly therefrom, a part-spherical hole in the free end of said link, a part-spherical bush in said hole and a pin secured to said non-rotatable portion of said vehicle and extending axially through said bush, said link at the end thereof associated with said flange being bifurcated to straddle a portion of said flange, a further part-spherical hole in said flange and lying between said bifurcation, a part-spherical bush in said hole, and a pin secured in said bifurcations and passing axially through said latter-named part-spherical bush, whereby said reaction member is free to be moved substantially axially and angularly with respect to the normal vertical plane of said disc upon actuation of said mechanism.

2. A disc brake assembly for vehicles or the like comprising a disc normally rotatable in a vertical plane, a non-rotatable housing comprising a pressure member and a reaction member axially aligned on opposite sides of the disc and covering only a minor part of the braking surface thereof and connected together by means extending axially adjacent a periphery of said disc, a first pad of friction material secured to the pressure member to frictionally engage one face of the disc, a second pad of friction material to frictionally engage the other face of the disc, a fluid pressure operated mechanism associated with the reaction member to force said second pad in one direction into contact with one face of the disc and to move the housing in the opposite direction to force said first pad into contact with the other face of the disc and an articulated connection between the housing and a fixed member to enable the housing to move axially relative to the disc and at the same time to tilt to accommodate wobbling or oscillation of said disc from said vertical plane, and in which said connection comprises a flange portion extending radially-axially of said reaction member and of substantially ring sector-like form, a part-spherical hole in one end of said flange, a part-spherical bush in said hole and a pin extending axially through said bush and secured in a non-rotatable portion of said vehicle or the like, a link secured to the other end of said flange and extending radially-inwardly thereof, a part-spherical hole in the free end of said link, a further part-spherical bush in said hole and a pin extending axially through said further bush and secured in said nonrotatable portion of said vehicle or the like.

3. A disc brake according to claim 2 wherein said link is secured to said flange by a pin secured in a bifurcation of said link straddling a portion of said flange, said pin passing axially through a part-spherical bush disposed in a part-spherical hole in said flange.

References Cited in the file of this patent

UNITED STATES PATENTS

| | | |
|---|---|---|
| 2,533,186 | Bricker et al. | Dec. 5, 1950 |
| 2,679,303 | Wright et al. | May 25, 1954 |
| 2,784,811 | Butler | Mar. 12, 1957 |